(12) United States Patent
Nagarajan et al.

(10) Patent No.: US 7,646,509 B1
(45) Date of Patent: Jan. 12, 2010

(54) PREVENT STRIKE-THROUGH AND SHOW-THROUGH IN PRINTING BY OBJECT BASED INK DENSITY CORRECTION

(75) Inventors: Rathnagiri Nagarajan, Delhi (IN); Anil Ahuja, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 517 days.

(21) Appl. No.: 11/610,316

(22) Filed: Dec. 13, 2006

(51) Int. Cl.
H04N 1/407 (2006.01)
H04N 1/60 (2006.01)

(52) U.S. Cl. .............. 358/1.9; 358/3.24; 358/3.26; 358/521; 358/537; 358/461; 358/452

(58) Field of Classification Search .......... 358/1.9, 358/3.24, 3.26, 502, 504, 518, 521, 537, 358/406, 452, 461, 463; 382/275, 274, 167, 382/112, 309; 347/19
See application file for complete search history.

(56) References Cited

U.S. PATENT DOCUMENTS 6,318,260 B1  11/2001  Chu et al.

OTHER PUBLICATIONS

Andrew Rodney, "Printing to a Presss", Printed from Web on Dec. 1, 2006, http://www.luminous-landscape.com/tutorials/Printing-to-Press.shtml.

*Primary Examiner*—Scott A Rogers
(74) *Attorney, Agent, or Firm*—Fish & Richardson P.C.

(57) ABSTRACT

A computer-implemented method for preventing strike-through and show-through in printing comprises grouping pages of an electronic document into at least one page pair, identifying an area of high ink density in a page of the page pair, adjusting ink density of an image object related to the area of high ink density to ameliorate the area of high ink density, and sending the electronic document to an output device.

26 Claims, 7 Drawing Sheets

PREVENT STRIKE-THROUGH AND SHOW-THROUGH IN PRINTING BY OBJECT BASED INK DENSITY CORRECTION

BACKGROUND

The present disclosure relates to adjusting the printing conditions of a document during document creation to minimize the make-ready stage.

Publications, such as newspapers and magazines, are printed in large volumes by high-volume printing methods such as offset printing. Image objects, including text and images, are printed on both sides of each paper of such publications. Commercially available software, such as Adobe® InDesign® CS2 and Adobe® Illustrator® CS2, can be used to create the image objects to be printed. In offset printing, the image objects to be printed are often transferred to films or plates. Computer to plate (CTP) imaging technology is a method where an electronic document is transferred directly to a printing plate. Inked regions of the plates including the image objects are selectively transferred to the paper via intermediary rubber blankets. Primary colors, namely, cyan (C), magenta (M), yellow (Y), and black (K), along with spot colored inks are applied in predetermined concentrations to the paper to create image objects corresponding to the image objects in the electronic document. Inkjet based printing methods are also available to print high-volume publications.

Prior to printing large volumes of publications, printing conditions including paper thickness, absorbent quality of the paper, paper transparency, ink quality (e.g., seeping characteristics), and concentration of primary colors (C, M, Y, K) to obtain intended color, are monitored and modified manually at the make-ready stage to prevent undesirable phenomena such as strike-through and show-through. Strike-through results when the ink printed on the front side of the paper penetrates the paper and is visible on the back side. Show-through results when the printing on the back side of the paper can be seen through the front side. Strike-through and show-through are visible in areas of excessive ink density on a back side of a page relative to the front side of the page. Strike-through and show-through are also caused by paper of high absorbency used in printing newspapers and thin, glossy papers used in printing magazines.

One method to detect strike-through and show-through is printing the document on paper and visually detecting strike-through and show-through in a hard copy of the print. The printing conditions can then be modified and monitored to correct strike-through and show-through. Such modifying and monitoring prior to high-volume printing consumes resources including time, paper, and ink. The stage between commencement of printing and arriving at the final version of the publication is known as the make-ready stage. Several printing presses employ operators to alter the printing conditions during the initial printing stages. The operators rely on their extensive experience to make requisite adjustments to the printing conditions to prevent strike-through and show-through and minimize the make-ready stage.

SUMMARY

This specification describes technologies relating to preventing strike-through and show-through in printing by object based ink density correction.

In general, one aspect of the subject matter described in this specification can be embodied in a computer-implemented method including grouping pages of an electronic document, based on double sided printing layout information, into at least one page pair including a first page and a second page, identifying an area of high ink density in the first page based on corresponding ink density in the second page and expected printing conditions, adjusting ink density for an image object related to the area of high ink density in the first page to ameliorate the area of high ink density, and sending the electronic document and the adjusted ink density to an output device. Other implementations of this aspect include corresponding systems, and computer program products, encoded on a computer-readable medium, operable to cause data processing apparatus to perform operations.

These and other implementations can optionally include one or more of the following features. The identifying can include comparing ink density of the first page with ink density of a mirror image of the second page and an ink threshold determined from the expected printing conditions including printing substrate color, printing substrate thickness, printing substrate absorbency, and ink characteristics, and designating the area of high ink density when the area in the first page has excessive ink density relative to the ink threshold and ink density in a corresponding area of the mirror image of the second page. The designating can include displaying, in a user interface, a visually distinct region to highlight the area of high ink density. Note that the corresponding area on the second page need not include any image objects.

The adjusting can include adjusting in response to a user input. The adjusting can include proportionally changing a concentration of inks used to create a color of the image object. The adjusting can include comparing the ink density of the area of high ink density in the first page with an ink threshold, identifying the image object related to the area of high ink density in the first page, and decreasing the ink density of the image object based on a result of the comparing. The area of high ink density can be contained in the image object. The adjusting can include identifying a first image object related to the area of high ink density in the first page, identifying a second image object related to the area of high ink density in a corresponding area of the second page, comparing ink density of the first image object with ink density of the second image object, and altering the ink density of the first image object and the second image object in conjunction with each other, based on a result of the comparing. The altering can further be based on an ink threshold. The altering can include altering in response to a user input. The altering can include altering in accordance with a first factor associated with the ink density of the first image object and a second factor associated with the ink density of the second image object. The adjusted ink density for the expected printing conditions can be saved and applied to print an electronic document under the same expected printing conditions.

Particular embodiments of the subject matter described in this specification can be implemented to realize one or more of the following advantages. Regions of high ink density in a page pair of an electronic document can be identified and designated during document creation. This allows modifying printing conditions to prevent strike-through and show-through prior to printing. A user can provide input to alter the printing conditions and see the effect of the input on the electronic document. The ink composition to obtain the intended color of the image objects that display strike-through and show-through can be corrected during document creation to reduce ink concentration in areas of high ink density. Such correction can be based on user input. In this manner, the areas of high ink density can be ameliorated before printing a hard copy of the document. This can reduce the time, paper, ink, and, therefore, expenditure required to perform such corrections during printing, thereby minimizing the make-ready stage. Corrections in the document creation stage allow ink composition changes to remain specific to the areas displaying strike-through and show-through. Correcting strike-through and show-through in the document creation stage, rather than when hard copies of the documents are printed by methods including offset printing, can prevent ink adjustments from propagating along the length of the paper. The user's ability to identify and correct strike-through and show-through reduces the reliance on experienced press operators in printing presses. Adjustments made to the document during document creation minimize corrections required during the downstream printing process. Further, combining the adjustments during document creation with corrections during downstream printing processes further improves quality control in printing.

The details of one or more implementations are set forth in the accompanying drawings and the description below. Other features, aspects, and advantages will become apparent from the description, the drawings, and the claims.

BRIEF DESCRIPTION OF THE DRAWINGS

FIG. 1 is a schematic diagram of an example of a system to prevent strike-through and show-through.

FIG. 6 is an example of a method of adjusting ink density of an image object to prevent strike-through and show-through.

FIG. 7 is an example of a method of adjusting ink density of an image object to prevent strike-through and show-through.

Like reference numbers and designations in the various drawings indicate like elements.

DETAILED DESCRIPTION

Figure 1:
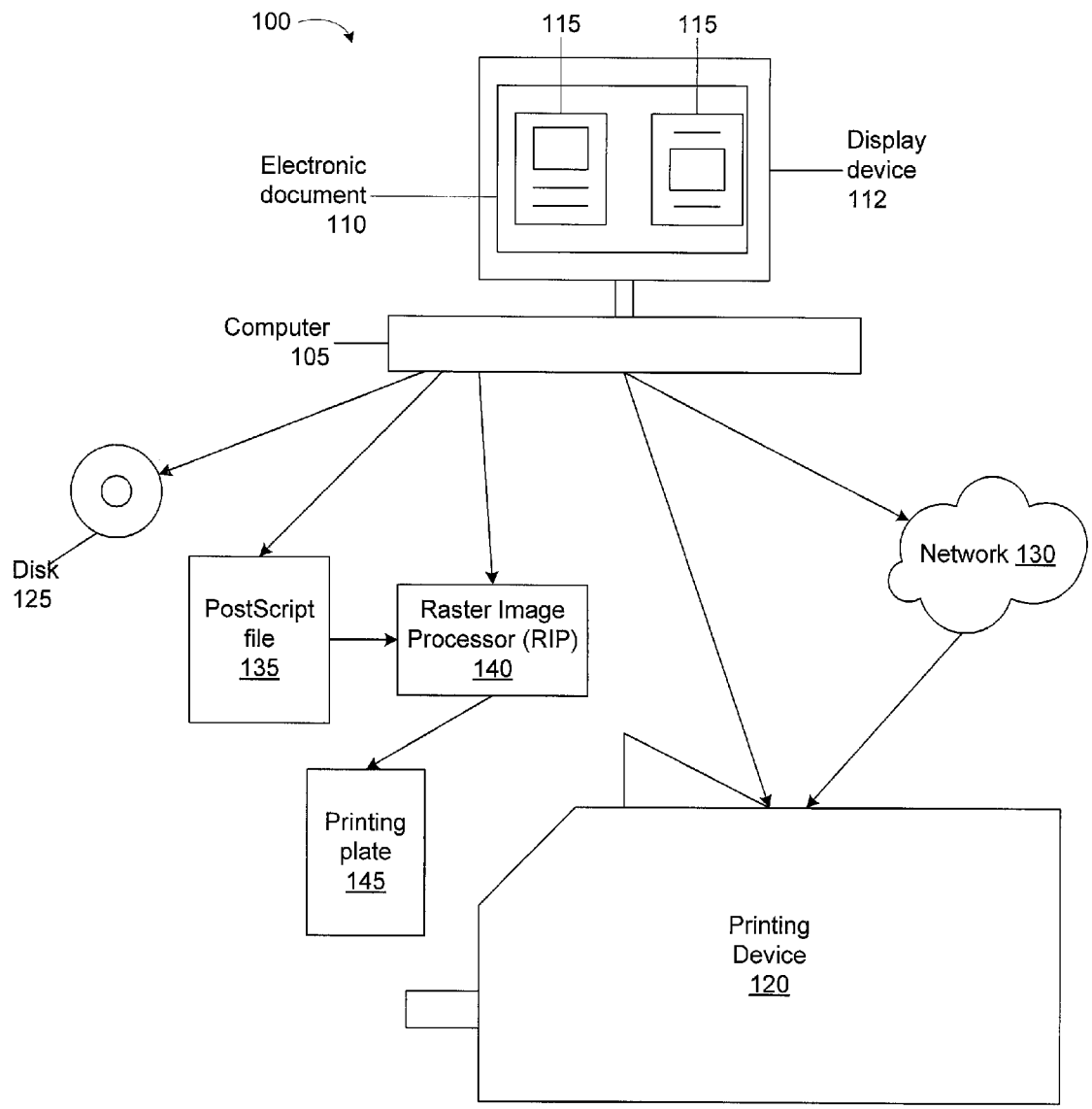

FIG. 1 depicts a schematic diagram of an example of a system 100 to prevent strike-through and show-through. The system 100 includes a computer 105 which a user can use to create an electronic document 110. An electronic document (which for brevity will simply be referred to as a document) does not necessarily correspond to a file. A document may be stored in a portion of a file that holds other documents, in a single file dedicated to the document in question, or in multiple coordinated files.

To provide for interaction with a user, implementations of the subject matter described in this specification can be implemented on a computer having a display device 112, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Commercially available software such as Adobe® InDesign® CS2 or Adobe® Illustrator® CS2 can be used to create the document. The document 110 includes a plurality of pages 115. The pages 115 include image objects, which include text and images. Upon creation and subsequent to editing, the user can send the document 110 and instructions for printing to an output device. In some implementations, the user can send the document 110 and the instructions for printing from the computer 105 to a printing device 120. In other implementations, the user can save the document 110 and the instructions for printing on a computer readable medium, such as a disk 125. In other implementations, the document 110 and the instructions for printing can be saved as a PostScript® file 135. The PostScript® file 135 can be exported to a raster image processor 140. The PostScript® file can be used to generate a film that can, in turn, be used to generate a printing plate 145 for use in offset printing. Alternatively, the PostScript® file can be used to directly generate a plate 145 for use in offset printing by CTP technology. In other implementations, the document 110 and the instructions for printing can be directly sent to the raster image processor 140 to generate the printing plate 145 for use in offset printing by CTP technology. The disk 125 can be part of an output device which can be used to print the document on a printing device 120. The printing device 120 can be configured to read the document and instructions from the disk 125. The instructions for printing the document 110 can be executed on the printing device 120. The user can transmit the document 110 and the instructions for printing from the computer 105 to the printing device 120 over a network 130.

Figure 2:
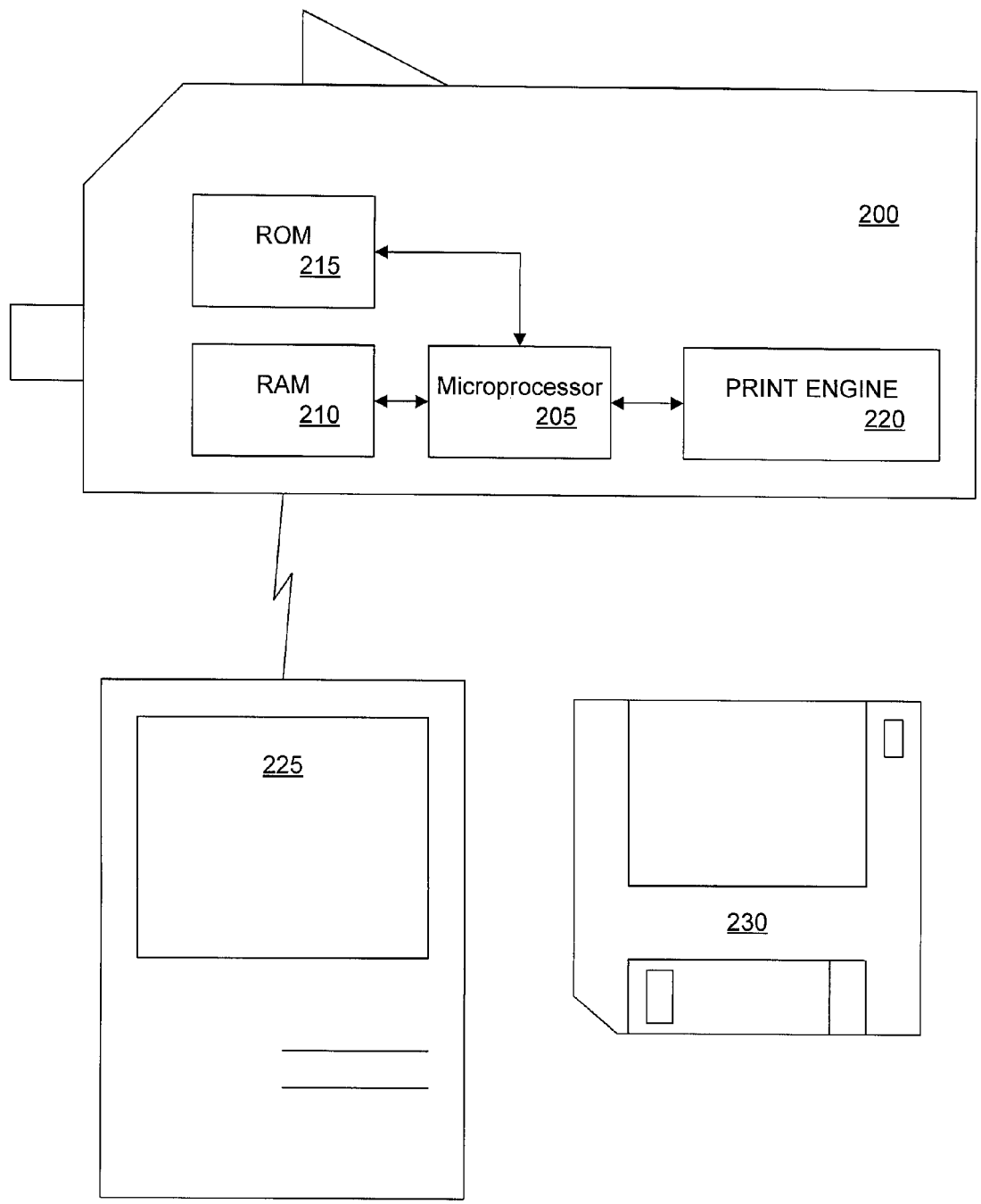
FIG. 2 is a schematic diagram of an example of a printing device for double sided printing of an electronic document.

FIG. 2 depicts a schematic diagram of an example of a printing device 200 for double sided printing of the document. By way of example, a printing device 200 implementing an interpreter for a page description language, such as the PostScript® language, includes a microprocessor 205 for executing program instructions (including font instructions) stored on a printer random access memory (RAM) 210 and a printer read-only memory (ROM) 215 and controlling a printer marking engine 220. The RAM 210 is optionally supplemented by a mass storage device such as a hard disk. The essential elements of a computer are a processor for executing instructions and a memory. A computer can generally also receive programs and data from a storage medium such as an internal disk or a removable disk 230. These elements will also be found in a conventional desktop or workstation computer 225 as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The printing device can be a printer used in offset printing. The instructions for printing can cause the printer to reduce the pressure of contact between the rollers and the substrate, thereby printing a thinner layer of ink. The printing device can be an ink jet printer or laser printer. The instructions for printing can cause the printer to recognize that an image object to be printed on the front page of a substrate lies over an image object to be printed on the back page of the substrate. The instructions for printing can cause the printer to adjust the ink density of the inks used to create one or both the image objects. The instructions for printing can cause the printer to decrease the size of the ink dots that are printed on the substrate, thereby printing a thinner layer of ink on the substrate. The output device can be any suitable device including a CTP device used to generate a plate, a raster image processor, or a device used to generate a film. The instructions for printing can cause the plate to be generated such that strike-through and show-through are accounted for, minimized, and corrected in the hard copy of the document.

Figure 3:
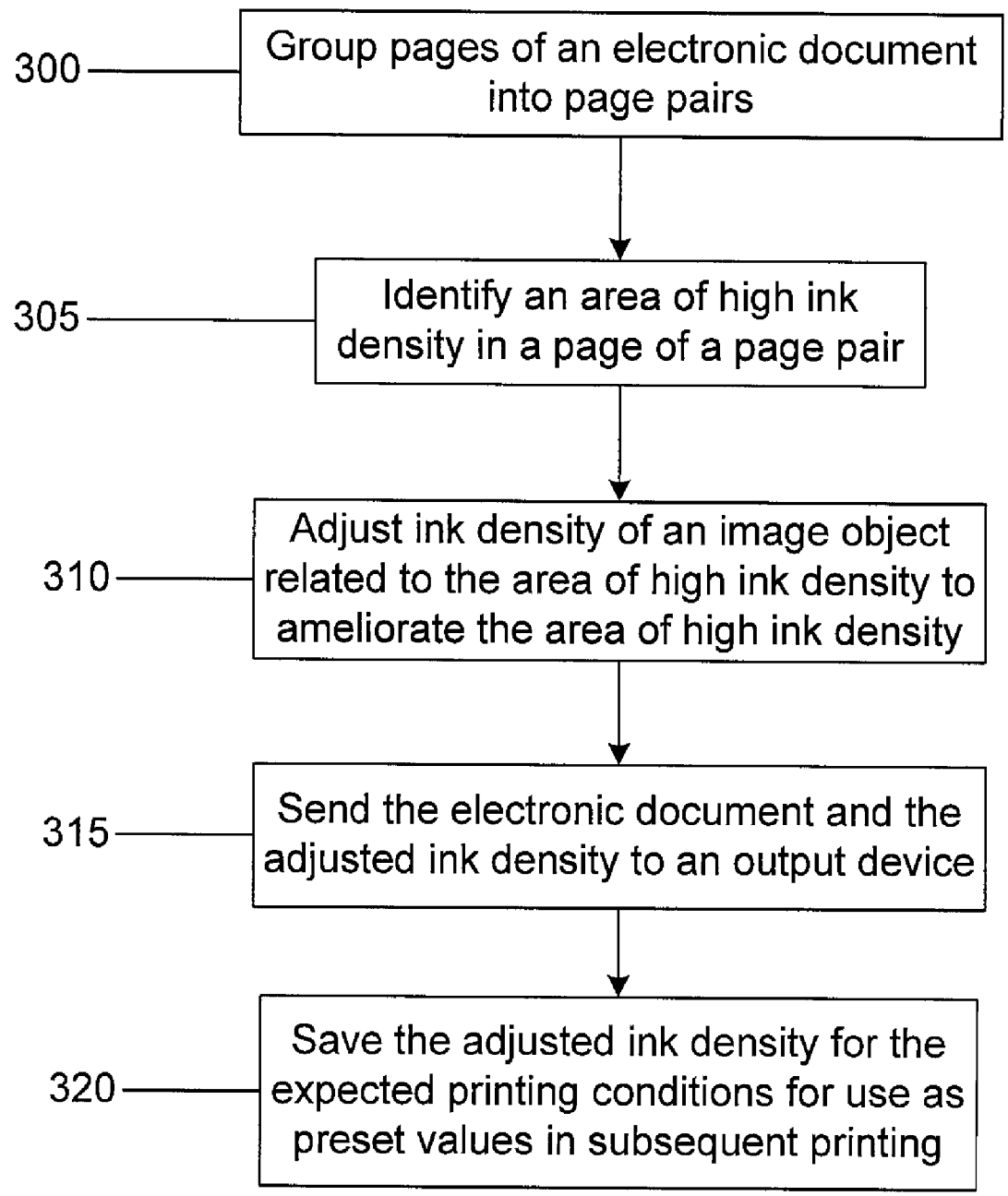
FIG. 3 is an example of a method of identifying and adjusting areas of strike-through and show-through in an electronic document.

FIG. 3 is an example of a method of identifying and adjusting areas of strike-through and show-through in a document. The pages of the document are grouped into page pairs at 300, wherein a page pair consists of two pages in the document that will print on back-to-back sides of the same substrate. All page pairs of the document can include image objects on both sides. One or more page pairs can include image objects on only one side of the page pair. For example, the document may include an odd number of pages causing image objects to be printed on only one side of at least one of the plurality of page pairs. Some or all portions of an image object in the first page may overlap some or all portions of an image object in the second page when the first and second page are grouped into a page pair.

Upon grouping pages into page pairs, one or more areas of high ink density in a page pair are identified at 305. The area of high ink density is an area that displays strike-through and show-through. In the document, the area of high ink density in a page includes one or more pixels on a screen. An image object on the same side of the page as the area of high ink density can contain all or part of the area of high ink density. More than one image object on the same side as the area of high ink density can be related to the area of high ink density. An image object related to the area of high ink density in a front side of a page pair may overlap an image object in the back side of the page. The back side corresponding to the area of high ink density may not contain an image object. The image objects can include multiple colors. Some or all colors on an image object may display strike-through and show-through.

Subsequently, the ink density of an image object related to the area of high ink density is adjusted to ameliorate the area of high ink density at 310. Ameliorating can refer to altering the printing conditions in the area of high ink density on one or both sides of the page pair to eliminate strike-through and show-through. Ameliorating can refer to altering the printing conditions on one or both sides of the page pair to decrease strike-through and show-through in the document during document creation so that fewer corrections are required during printing, thereby reducing the make-ready stage. In some implementations, the printing conditions are altered in response to user input. In other implementations, the printing conditions are automatically altered. In other implementations, the user is provided with recommendations to alter the ink density. The user may accept the recommendations or over-ride the suggestions with the user's own input.

If the ink density of the area of high ink density alone is altered, the color quality of the image object related to the area of high ink density may be altered in a non-uniform manner. The print quality of the altered image object may not match that of the intended image object. Therefore, the ink density of the entire image object related to the area of high ink density can be altered proportionally to preserve the quality of the image. In some implementations, the ink density is altered by instructing the printing device to alter the size of dots of ink. In other implementations, the ink density is altered by instructing the printing device to alter the spacing between the dots of ink. In other implementations, ink density can be altered by instructing the printing device to employ a combination of altering the size of dots and the spacing between dots of ink. Alternatively, or in addition, paper of different quality can be used. In some implementations, the user is presented with a user interface indicating the ink density of each of the primary inks (C, M, Y, K) and that of the spot colored ink, that is combined to create the aggregate ink. The user may alter the aggregate ink density. The user may proportionally alter the ink density of each ink. The user may alter the ink density of each ink individually.

For example, the user may use total ink limits, also known as total area coverage (TAC) to specify the amount of ink used when printing. If 100% of each of the inks, namely C, Y, M, and K, are used when printing, the total ink would be 400%. The user may alter the aggregate ink density to a value depending on printing conditions, such as between 280% and 340% for coated or less absorbent papers. Similarly, the user may alter the aggregate ink density to a value between 200% to 240% for more absorbent papers such as papers used in printing newspapers. Alternatively, the user may alter the quantity of each ink to arrive at the total ink limit.

The document and the adjusted ink density are sent to an output device at 315. In some implementations, the document and the adjusted ink density are sent to a printing device such as a printing press. In other implementations, the document and the adjusted ink density are saved to a computer-readable medium such as a disk. The document and the adjusted ink density can be saved as PostScript® file(s). In other implementations, the document and the adjustments are transmitted to a remote system over a network. The document can be sent to an output device, such as a raster image processor. A rasterized output, such as a tagged image file format (TIFF) or Scitex continuous tone (CT) file can be obtained from the raster image processor, which can subsequently be used to generate a film or a plate. The adjusted ink density can alter the design of the plate to minimize or prevent strike-through and show-through. The plate can subsequently be used to print hard copies by offset printing methods. The ink density for the particular set of printing conditions can be saved at 320 and used as preset values in future printing when printing conditions match the printing conditions of the saved ink densities.

Figure 4:
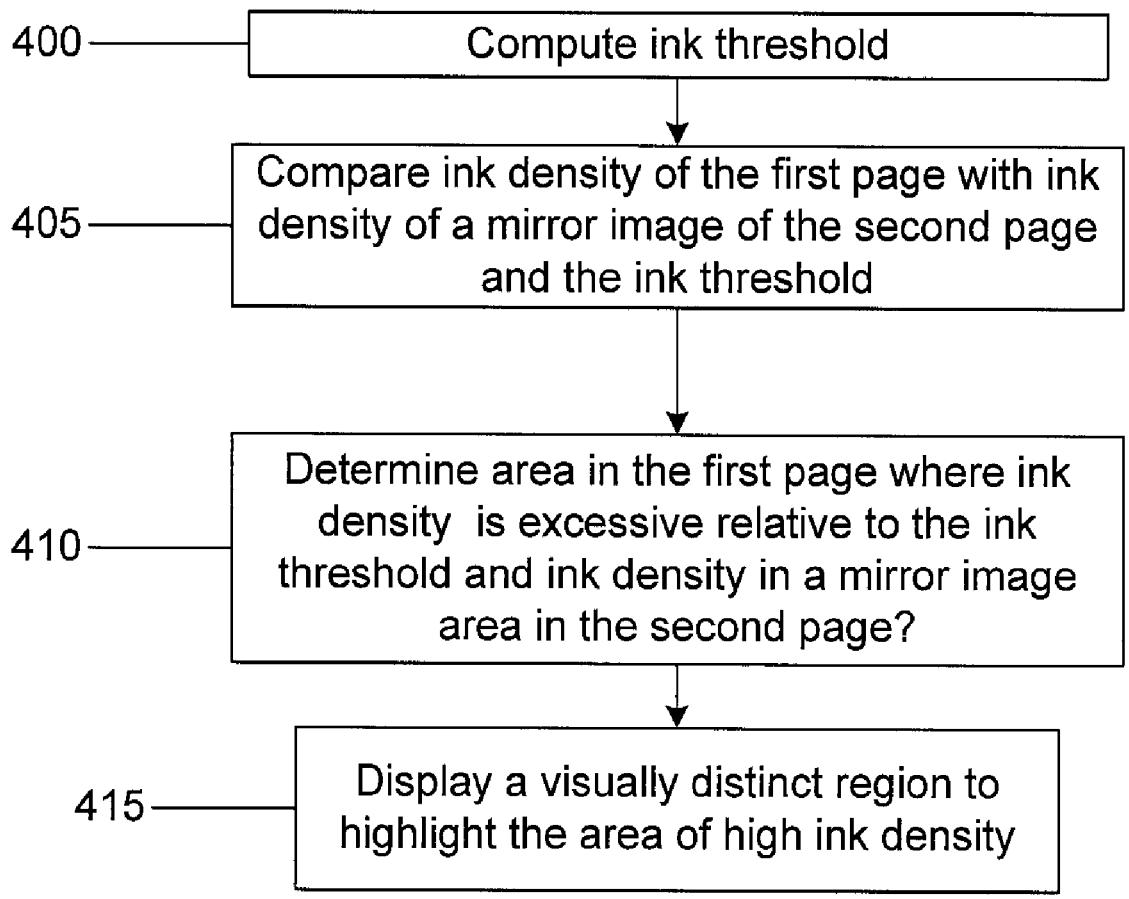
FIG. 4 is an example of a method of displaying an area of high ink density in a page to a user.

FIG. 4 depicts an example of a method of displaying an area of high ink density in a page to a user. An ink threshold can be computed based on printing conditions at 400. The printing conditions can include paper thickness, paper color, paper absorbency, ink characteristics, moisture content, and ambient temperature in the press room. The user can input the printing conditions to compute the ink threshold. The printing conditions may be available as preset values. The ink threshold can be the farthest distance that the ink can be absorbed by the front side of the substrate without showing through the back side. The ink threshold can be exceeded if the ink is absorbed beyond half the thickness of the substrate. In other implementations, the user can input an ink threshold. In other implementations, the computed ink threshold can be presented to the user. The user may either accept the computed ink threshold or over-ride the computed threshold with a user's choice.

The ink density of the first page of the page pair is compared to the ink density of the mirror image of the second page of the page pair and the ink threshold at 405. In some implementations, the ink density is measured as a function of factors including the size of the dots printed in an area, the spacing between the dots, and the color and brightness of the aggregate ink. The color and brightness of the aggregate ink can depend on the concentration of the primary inks (C, M, Y, K) and spot colored inks used to create the aggregate ink. The area in the first page may contain all or a portion of a first image object that overlaps all or a portion of a second image object on the corresponding area of the mirror image of the second page. The area in the mirror image of the second page corresponding to the area in the first page may contain no image object.

If the ink density in an area in the first page is found to be excessive relative to the ink threshold and the ink density in a corresponding area of the mirror of the second page, the area in the first page is designated as the area of high ink density at 410. The designated area on the first page, when printed on the front side of a substrate, displays strike-through and show-through and can be seen from the back side of the substrate. In some implementations, a visually distinct region highlighting the area of high ink density is displayed to the user at 415. The visually distinct region can be a contour that encompasses the area of high ink density. The visually distinct region can be a shading placed over the area of high ink density. The color of the contour and the shading is readily discerned by the user. For example, the visually distinct region can be a red line of 1 point stroke path encompassing the area of high ink density. If the ink density in the first page is not excessive relative to the ink threshold and the ink density in a mirror image area on the second page, no area of high ink density exists in the page pair.

Figure 5:
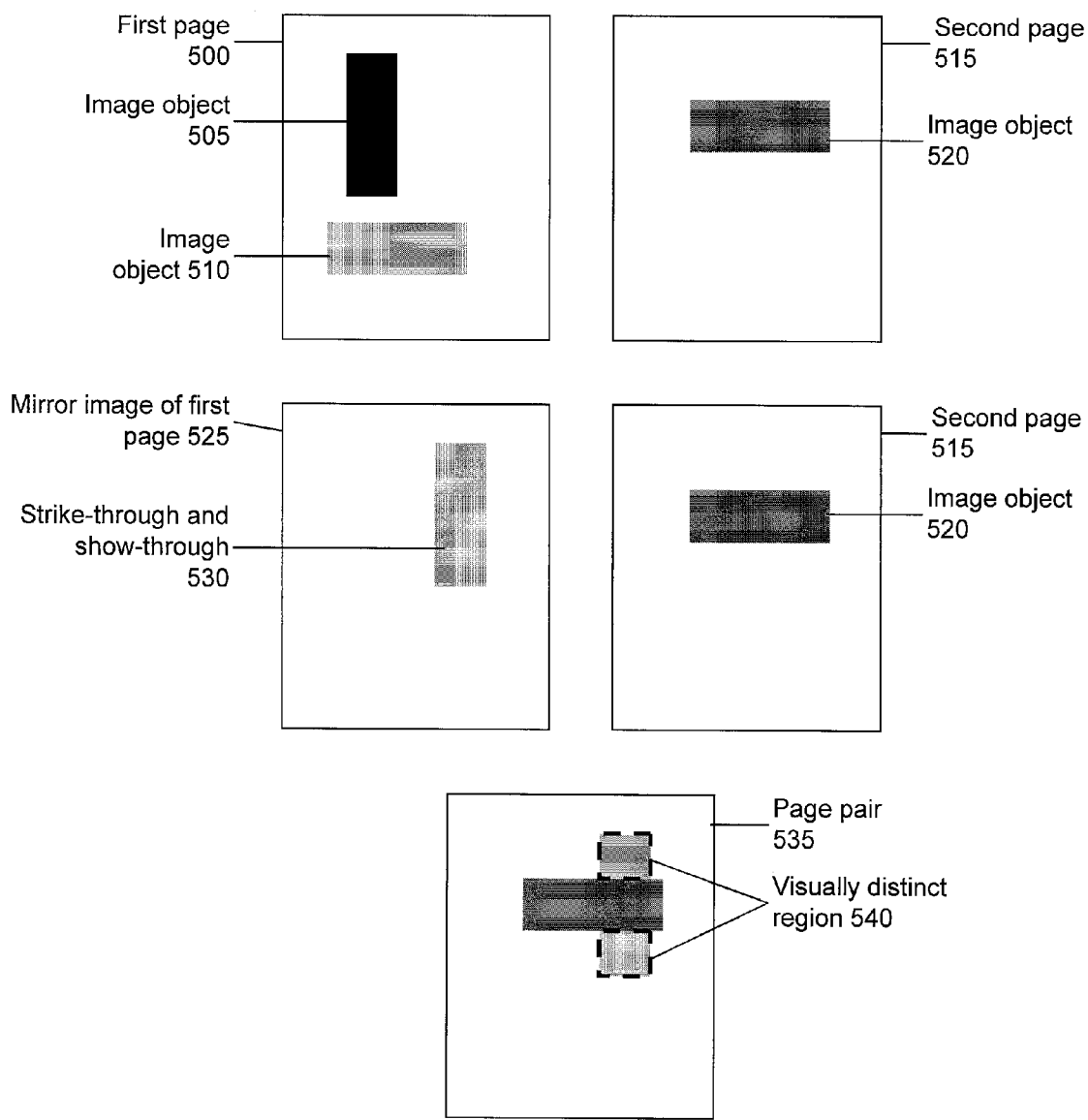
FIG. 5 is a schematic diagram of an example of highlighting an area of high ink density in a page pair.

FIG. 5 depicts a schematic of an example of highlighting an area of high ink density in a page pair. A first page 500 can include two image objects 505 and 510. A second page 515 can include an image object 520. In the example shown, the second page 515 is printed on the front side and the first page 500 is printed on the back side of the same substrate. Alternatively, the first page 500 can be printed on the front side and the second page 515 can be printed on the back side of the substrate. A mirror image 525 of the first page is compared with the second page 515. The first page 500 and second page 515 are grouped into a page pair 535. In the example shown, the ink density of the image object 505 is excessive relative to the ink threshold determined for the printing conditions, while that of image object 510 is not. Therefore, when printed on a substrate, the image object 505 displays strike-through and show-through 530 and can be seen from the back side of the substrate. Therefore, the image object 505 is an area of high ink density.

In the example shown, a portion of the image object 520 lies on the area displaying strike-through and show-through 530. Due to the dark ink of the image object 520, only a portion of the area of strike-through and show-through 530 can be seen from the back side of the substrate. Alternatively, the color of the ink of the image object on the front side may be light so that the entire area of high ink density can be seen from the front side of the substrate. When only a portion of the image object 505 that can be seen from the front side of the page pair 535, only that portion need be highlighted as an area of high ink density. Visually distinct regions 540 are placed around the area of high ink density to highlight the area to the user. The visually distinct regions 540 placed around the area of high ink density may be red lines of 1 pt stroke path.

Figure 6:
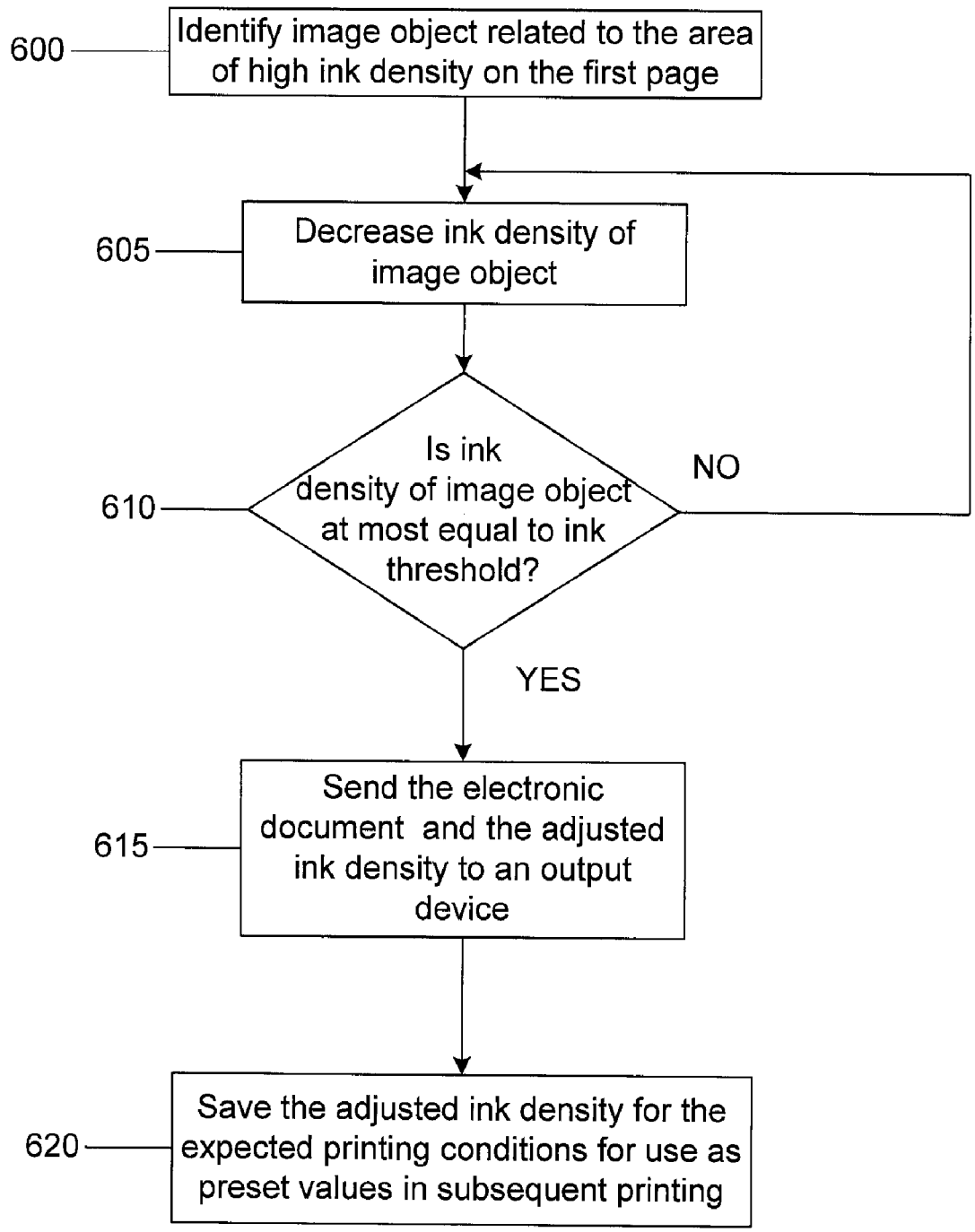

FIG. 6 depicts an example of a method of adjusting ink density of an image object to prevent strike-through and show-through. An image object related to the area of high ink density on the first page is identified at 600. The area of high ink density can be a portion of the image object. The entire image object can be the area of high ink density. The same image object can relate to multiple areas of high ink density. For example, if the image object is an image of a chess board where the black squares can be seen through the back side of the substrate while the white squares cannot, then the black squares are the multiple areas of high ink density. However, the same image object is related to the multiple areas.

In some implementations, the image object related to the area of high ink density can be printed on an area on the front side of a substrate with no image object on the corresponding area of the back side of the substrate. In this case, the area of high ink density on a first page of a page pair is a function of the ink threshold alone. The ink density of the image object is decreased at 605 to ameliorate the area of high ink density. In some implementations, the ink density is reduced by decreasing the size of the dots of ink printed on the paper. The ink density can also be reduced by increasing the spacing between the dots of ink printed on the paper. In some implementations, the ink density can be altered by altering the tint value of the ink. The tint value of the ink refers to the percentage of allocated area occupied by ink and can range from 0% (no ink in allocated area) to 100% (all of the allocated area is covered by ink). The reduced ink density of the image object is compared with the ink threshold at 610. The ink density of the image object is reduced until the reduced ink density is at most equal to the ink threshold. Subsequently, the document and the adjusted ink density are sent to the output device at 615. In some implementations, the output device is a printing device. Upon printing a sample document, the user can provide additional input to alter the ink density such as increasing or decreasing the ink density. Once an ink density for a set of printing conditions that causes no strike-through and show-through is determined, the ink density for the particular set of printing conditions can be saved at 620 and used as preset values in future printing when printing conditions match the printing conditions of the saved ink densities.

The user may wish to have certain image objects on one or both sides of the page pair print with high ink density so as to be prominent. In some implementations, when a hard copy of the page pair is printed, the user may provide input to increase the ink density of one or more image objects to improve visibility of the image object. The user may increase the ink density of the image object above the ink threshold until no strike-through or show-through is visible. In other implementations, the ink density of an image object on the front side of the page pair may be altered based on an overlapping image object on the back side of the page pair. The overlapping image object on the back side may be smaller than, equal to, or larger than the size of the image object on the front side.

Figure 7:
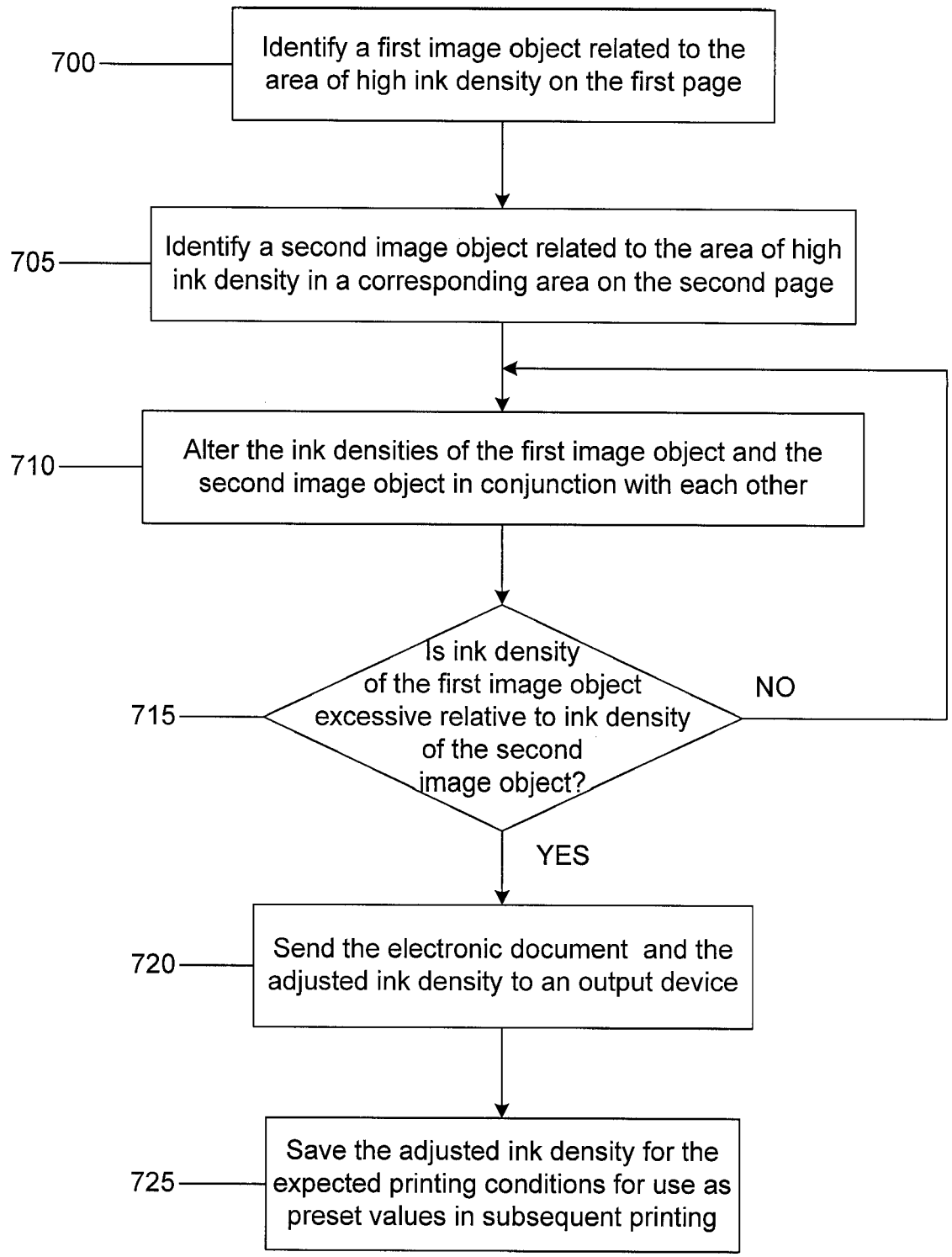

FIG. 7 depicts an example of a method of adjusting ink density of an image object to prevent strike-through and show-through. A second image object printed on the back side of a substrate may overlap the first image object printed on the front side of the substrate. In the document, the first image object is related to an area of high ink density. In this case, strike-through and show-through may be a function of both ink threshold and the ink density of the second image object. Thus, in some implementations, a first object related to the area of high ink density on the first page is identified at 700, and a second image object related to the corresponding area on the mirror image of the second page is identified at 705.

The ink densities of the first image object and the second image object are altered in conjunction with each other at 710. The ink densities of both image objects can be altered. The ink density of the first image object (x) can be associated with a first factor (a). The ink density of the second image object (y) can be associated with a second factor ($\alpha$). The factors $\alpha$ and $\beta$ can be altered such that the function, $[(\alpha)(x)+(\beta)(y)]$, is less than the ink threshold. The factors $\alpha$ and $\beta$ may be automatically determined based on expected printing conditions. The factors $\alpha$ and $\beta$ may be input by the user. The user can be provided with recommendations for the factors. The user may either accept the recommendations or over-ride the recommendations with user input. The ink density of only one image object may be altered. In some implementations, the ink density is altered in response to a user input. In other implementations, the ink density is automatically altered. In other implementations, a user is provided recommendations to alter the ink density. The user may approve the recommendations or over-ride the recommendations with the user's input.

Subsequent to altering, the ink densities of the first image object and the second image object are compared at 715. If the area of the first image object contains and is larger than the corresponding area of the mirror image of the second image object or vice versa, the ink densities of the first image object and the second image object are altered in conjunction with each other based on the result of the comparing as well as the ink threshold. The ink density of the second image object is altered based on factors including the brightness of the colors on the second image object. If the colors of the second image object are dark, the areas of high ink density of the first image object may be masked by the dark colors of the second image object and no correction may be required. If the colors of the image object are light so that areas of high ink density of the first image object can be seen through the second image object, either the ink density of the first image object can be decreased or the ink density of the second image object can be increased or both operations may be performed. In some implementations, the user may provide inputs to alter the ink density. In other implementations, the alterations may be automatically performed.

Subsequently, the documents and the adjusted ink density are sent to an output device at 720. In some implementations, the effect of the adjusted ink density is determined during document creation and the printing device prints the document with no strike-through and show-through. In other implementations, adjusting the ink density in the document during document creation minimizes strike-through and show-through. The printing device prints the document with the adjusted ink density and the user determines if further adjustments are required based on a hard copy of the document. In other implementations, instructions may be embedded into the printing device to determine strike-through and show-through in the hard copy of a document. Based on such instructions, the printing device can determine that strike-through and show-through are not completely prevented. Subsequently, the printing device may prompt the user to make further adjustments to the ink density. The printing device may send a message that strike-through and show-through have not been completely prevented to the computer from which the document was received. The computer can then prompt the user to provide additional input to adjust ink density. The printing device may adjust the ink density further to prevent strike-through and show-through. Once an ink density for a set of printing conditions that causes no strike-through and show-through is determined, the ink density for the particular set of printing conditions can be saved at 725 and used as preset values in future printing when printing conditions match the printing conditions of the saved ink densities.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results. In some implementations, instructions for identifying areas of high ink density may be embedded in the printing device. The document including the page pairs may be transmitted to the printing device. The printing device may identify areas of high ink density and adjust the ink density in the identified areas to correct strike-through and show-through.

Alternatively, the areas of high ink density may be displayed to a user. The user may provide input to alter the ink density in the identified areas to correct strike-through and show-through. The user input may cause the printing device to alter the printing conditions prior to printing. The printing device may determine the new printing conditions based on user input and provide feedback to the user of the presence or absence of areas of high ink density displaying strike-through and show-through.

What is claimed is:

1. A computer-implemented method comprising:
   grouping pages of an electronic document, based on double sided printing layout information, into at least one page pair comprising a first page and a second page;
   identifying an area of high ink density in the first page based on corresponding ink density in the second page and expected printing conditions;
   adjusting ink density for an image object related to the area of high ink density in the first page to ameliorate the area of high ink density; and
   sending the electronic document and the adjusted ink density to an output device.

2. The method of claim 1, wherein the identifying comprises:
   comparing ink density of the first page with ink density of a mirror image of the second page and an ink threshold determined from the expected printing conditions including printing substrate color, printing substrate thickness, printing substrate absorbency, and ink characteristics; and
   designating the area of high ink density when the area in the first page has excessive ink density relative to the ink threshold and ink density in a corresponding area of the mirror image of the second page.

3. The method of claim 2, wherein the designating comprises displaying, in a user interface, a visually distinct region to highlight the area of high ink density.

4. The method of claim 2, wherein the corresponding area of the second page does not include any image objects.

5. The method of claim 1, wherein the adjusting comprises adjusting in response to a user input.

6. The method of claim 1, wherein the adjusting comprises proportionally changing a concentration of inks used to create a color of the image object.

7. The method of claim 1, wherein the adjusting comprises:
   comparing the ink density of the area of high ink density in the first page with an ink threshold;
   identifying the image object related to the area of high ink density in the first page; and
   decreasing the ink density of the image object based on a result of the comparing.

8. The method of claim 7, wherein the area of high ink density is contained in the image object.

9. The method of claim 1, wherein the adjusting comprises:
   identifying a first image object related to the area of high ink density in the first page;
   identifying a second image object related to the area of high ink density in a corresponding area of the second page;
   comparing ink density of the first image object with ink density of the second image object; and
   altering the ink density of the first image object and the second image object in conjunction with each other, based on a result of the comparing.

10. The method of claim 9, wherein the altering is further based on an ink threshold.

11. The method of claim 9, wherein the altering comprises altering in response to a user input.

12. The method of claim 9, wherein the altering comprises altering in accordance with a first factor associated with the ink density of the first image object and a second factor associated with the ink density of the second image object.

13. The method of claim 1, further comprising:
saving the adjusted ink density for the expected printing conditions; and
applying the saved adjusted ink density to print an electronic document under the same expected printing conditions.

14. A computer-readable medium encoded with a computer program operable to cause data processing apparatus to perform operations comprising:
grouping pages of an electronic document, based on double sided printing layout information, into at least one page pair comprising a first page and a second page;
identifying an area of high ink density in the first page based on corresponding ink density in the second page and expected printing conditions;
adjusting ink density for an image object related to the area of high ink density in the first page to ameliorate the area of high ink density; and
sending the electronic document and the adjusted ink density to an output device.

15. The computer-readable medium of claim 14, wherein the identifying comprises:
comparing ink density of the first page with ink density of a mirror image of the second page and an ink threshold determined from the expected printing conditions including printing substrate color, printing substrate thickness, printing substrate absorbency, and ink characteristics; and
designating the area of high ink density when the area in the first page has excessive ink density relative to the ink threshold and ink density in a corresponding area of the mirror image of the second page.

16. The computer-readable medium of claim 15, wherein the designating comprises displaying, in a user interface, a visually distinct region to highlight the area of high ink density.

17. The computer-readable medium of claim 15, wherein the corresponding area of the second page does not include any image objects.

18. The computer-readable medium of claim 14, wherein the adjusting comprises adjusting in response to a user input.

19. The computer-readable medium of claim 14, wherein the adjusting comprises proportionally changing a concentration of inks used to create a color of the image object.

20. The computer-readable medium of claim 14, wherein the adjusting comprises:
comparing the ink density of the area of high ink density in the first page with an ink threshold;
identifying the image object related to the area of high ink density in the first page; and
decreasing the ink density of the image object based on a result of the comparing.

21. The computer-readable medium of claim 20, wherein the area of high ink density is contained in the image object.

22. The computer-readable medium of claim 14, wherein the adjusting comprises:
identifying a first image object related to the area of high ink density in the first page;
identifying a second image object related to the area of high ink density in a corresponding area of the second page;
comparing ink density of the first image object with ink density of the second image object; and
altering the ink density of the first image object and the second image object in conjunction with each other, based on a result of the comparing.

23. The computer-readable medium of claim 22, wherein the altering is further based on an ink threshold.

24. The computer-readable medium of claim 22, wherein the altering comprises altering in response to a user input.

25. The computer-readable medium of claim 22, wherein the altering comprises altering in accordance with a first factor associated with the ink density of the first image object and a second factor associated with the ink density of the second image object.

26. The computer-readable medium of claim 14, the operations further comprising:
saving the adjusted ink density for the expected printing conditions; and
applying the saved adjusted ink density to print an electronic document under the same expected printing conditions.

* * * * *

UNITED STATES PATENT AND TRADEMARK OFFICE
CERTIFICATE OF CORRECTION

PATENT NO. : 7,646,509 B1
APPLICATION NO. : 11/610316
DATED : January 12, 2010
INVENTOR(S) : Nagarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Twenty-eighth Day of December, 2010

David J. Kappos
*Director of the United States Patent and Trademark Office*